(12) United States Patent
McCallion et al.

(10) Patent No.: US 7,962,044 B2
(45) Date of Patent: Jun. 14, 2011

(54) TEMPERATURE STABILIZING PACKAGING FOR OPTOELECTRONIC COMPONENTS IN A TRANSMITTER MODULE

(75) Inventors: Kevin McCallion, Charlestown, MA (US); Michael Deutsch, Derry, NH (US); Parviz Tayebati, Boston, MA (US); Saeid Azemati, Auburndale, MA (US)

(73) Assignee: Finisar Corporation, Sunnyvale, CA (US)

( * ) Notice: Subject to any disclaimer, the term of this patent is extended or adjusted under 35 U.S.C. 154(b) by 630 days.

(21) Appl. No.: 12/025,573

(22) Filed: Feb. 4, 2008

(65) Prior Publication Data

US 2008/0187325 A1 Aug. 7, 2008

Related U.S. Application Data

(60) Provisional application No. 60/899,229, filed on Feb. 2, 2007.

(51) Int. Cl.
*H04B 10/04* (2006.01)
(52) U.S. Cl. ........ 398/192; 398/194; 398/195; 398/196; 398/197; 398/201; 385/24; 385/37; 385/15; 385/7; 372/20; 372/32; 372/34; 372/36; 372/38.02; 356/519; 356/454; 356/460
(58) Field of Classification Search .......... 398/182, 398/183, 186, 192, 193, 194, 195, 196, 197, 398/198, 200, 201, 79, 81, 158, 159, 84, 398/85, 87, 136, 137, 199, 33, 38; 385/24, 385/14, 15, 31, 37, 7, 28, 88, 90, 92, 93, 385/89; 372/20, 26, 32, 34, 36, 38.02, 29.02, 372/107, 108, 101; 356/519, 506, 460, 452, 356/454
See application file for complete search history.

(56) References Cited

U.S. PATENT DOCUMENTS

| | | | |
|---|---|---|---|
| 3,324,295 | A | 6/1967 | Harris |
| 3,973,216 | A | 8/1976 | Hughes et al. |
| 3,999,105 | A | 12/1976 | Archey et al. |
| 4,038,600 | A | 7/1977 | Thomas et al. |
| 4,561,119 | A | 12/1985 | Epworth |
| 4,671,604 | A | 6/1987 | Soref |

(Continued)

FOREIGN PATENT DOCUMENTS

CA 2510352 3/2010

(Continued)

OTHER PUBLICATIONS

Alexander et al., Passive Equalization of Semiconductor Diode Laser Frequency Modulation, Journal of Lightwave Technology, Jan. 1989, 11-23, vol. 7, No. 1.
Binder, J. et al., 10 Gbit/s-Dispersion Optimized Transmission at 1.55 um Wavelength on Standard Single Mode Fiber, IEEE Photonics Technology Letters, Apr. 1994, 558-560, vol. 6, No. 4.
Hyryniewicz, J.V., et al., Higher Order Filter Response in Coupled MicroRing Resonators, IEEE Photonics Technology Letters, Mar. 2000, 320-322, vol. 12, No. 3.

(Continued)

*Primary Examiner* — Hanh Phan
(74) *Attorney, Agent, or Firm* — Maschoff Gilmore & Israelsen

(57) ABSTRACT

An optical transmitter is disclosed having a temperature stabilization system for an optical filter for maintaining constant the frequency response of the filter. The filter is mounted within a housing having a substantially higher thermal conductivity. The housing may include a copper-tungsten alloy and extend along the optical axis of the filter. The housing is in thermal contact with a thermo-electric cooler (TEC) and a temperature sensor. The TEC and temperature sensor are electrically coupled to a controller which adjusts the temperature of the TEC according to the output of the temperature sensor.

27 Claims, 5 Drawing Sheets

U.S. PATENT DOCUMENTS

| | | | |
|---|---|---|---|
| 4,754,459 A | 6/1988 | Westbrook | |
| 4,805,235 A | 2/1989 | Henmi | |
| 4,841,519 A | 6/1989 | Nishio | |
| 4,896,325 A | 1/1990 | Coldren | |
| 4,908,883 A | 3/1990 | Rivera | |
| 4,914,667 A | 4/1990 | Blonder et al. | |
| 5,088,097 A | 2/1992 | Ono et al. | |
| 5,119,393 A | 6/1992 | Oka et al. | |
| 5,136,598 A | 8/1992 | Weller et al. | |
| 5,170,402 A | 12/1992 | Ogita et al. | |
| 5,177,630 A | 1/1993 | Goutzoulis et al. | |
| 5,293,545 A | 3/1994 | Huber | |
| 5,325,378 A | 6/1994 | Zorabedian | |
| 5,325,382 A | 6/1994 | Emura et al. | |
| 5,371,625 A | 12/1994 | Wedding et al. | |
| 5,394,429 A | 2/1995 | Yamada et al. | |
| 5,412,474 A | 5/1995 | Reasenberg et al. | |
| 5,416,629 A | 5/1995 | Huber | |
| 5,434,693 A | 7/1995 | Tanaka et al. | |
| 5,450,432 A | 9/1995 | Okuda | |
| 5,459,799 A | 10/1995 | Weber | |
| 5,465,264 A | 11/1995 | Buhler et al. | |
| 5,477,368 A | 12/1995 | Eskildsen et al. | |
| 5,550,667 A | 8/1996 | Krimmel et al. | |
| 5,568,311 A | 10/1996 | Matsumoto | |
| 5,592,327 A | 1/1997 | Gabl et al. | |
| 5,642,371 A | 6/1997 | Tohyama et al. | |
| 5,696,859 A * | 12/1997 | Onaka et al. | 385/24 |
| 5,737,104 A | 4/1998 | Lee et al. | |
| 5,777,773 A | 7/1998 | Epworth et al. | |
| 5,805,235 A | 9/1998 | Bedard | |
| 5,856,980 A | 1/1999 | Doyle | |
| 5,920,416 A | 7/1999 | Beylat et al. | |
| 5,946,129 A | 8/1999 | Xu et al. | |
| 5,953,139 A | 9/1999 | Nemecek et al. | |
| 5,953,361 A | 9/1999 | Borchert | |
| 5,974,209 A | 10/1999 | Cho et al. | |
| 5,991,323 A | 11/1999 | Adams et al. | |
| 6,018,275 A | 1/2000 | Perrett et al. | |
| 6,081,361 A | 6/2000 | Adams et al. | |
| 6,088,373 A | 7/2000 | Hakki | |
| 6,091,743 A | 7/2000 | Yang | |
| 6,096,496 A | 8/2000 | Frankel | |
| 6,104,851 A | 8/2000 | Mahgerefteh | |
| 6,115,403 A | 9/2000 | Brenner et al. | |
| 6,148,017 A | 11/2000 | Borchert et al. | |
| 6,157,025 A | 12/2000 | Katagiri et al. | |
| 6,188,499 B1 | 2/2001 | Majima | |
| 6,222,861 B1 | 4/2001 | Kuo et al. | |
| 6,271,959 B1 | 8/2001 | Kim et al. | |
| 6,282,003 B1 | 8/2001 | Logan et al. | |
| 6,298,186 B1 | 10/2001 | He | |
| 6,331,991 B1 | 12/2001 | Mahgerefteh | |
| 6,351,585 B1 | 2/2002 | Amundson et al. | |
| 6,353,623 B1 | 3/2002 | Munks | |
| 6,359,716 B1 | 3/2002 | Taylor | |
| 6,421,151 B1 | 7/2002 | Berger | |
| 6,459,518 B1 | 10/2002 | Suzuki et al. | |
| 6,473,214 B1 | 10/2002 | Roberts et al. | |
| 6,486,440 B1 | 11/2002 | Crafts et al. | |
| 6,506,342 B1 | 1/2003 | Frankel | |
| 6,522,809 B1 | 2/2003 | Takabayashi et al. | |
| 6,563,623 B1 | 5/2003 | Penninckx et al. | |
| 6,577,013 B1 | 6/2003 | Glenn et al. | |
| 6,580,739 B1 | 6/2003 | Coldren | |
| 6,618,513 B2 | 9/2003 | Evankow, Jr. | |
| 6,628,690 B1 | 9/2003 | Fish et al. | |
| 6,650,667 B2 | 11/2003 | Nasu et al. | |
| 6,654,564 B1 | 11/2003 | Colbourne et al. | |
| 6,658,031 B2 | 12/2003 | Tuganov et al. | |
| 6,665,351 B2 | 12/2003 | Hedberg et al. | |
| 6,687,278 B1 | 2/2004 | Mason et al. | |
| 6,690,686 B2 | 2/2004 | Delfyett | |
| 6,738,398 B2 | 5/2004 | Hirata | |
| 6,748,133 B2 | 6/2004 | Liu et al. | |
| 6,778,307 B2 | 8/2004 | Clark | |
| 6,785,308 B2 * | 8/2004 | Dyer et al. | 372/29.02 |
| 6,807,215 B2 | 10/2004 | Lam et al. | |
| 6,810,047 B2 | 10/2004 | Oh et al. | |
| 6,815,786 B2 | 11/2004 | Ogasawara et al. | |
| 6,834,134 B2 | 12/2004 | Brennan et al. | |
| 6,836,487 B1 | 12/2004 | Farmer et al. | |
| 6,847,758 B1 | 1/2005 | Watanabe | |
| 6,943,951 B2 | 9/2005 | Kikuchi et al. | |
| 6,947,206 B2 | 9/2005 | Tsadka et al. | |
| 6,963,685 B2 | 11/2005 | Mahgerefteh et al. | |
| 7,013,090 B2 | 3/2006 | Adachi et al. | |
| 7,027,470 B2 * | 4/2006 | May | 372/20 |
| 7,054,538 B2 | 5/2006 | Mahgerefteh et al. | |
| 7,073,956 B1 | 7/2006 | Shin et al. | |
| 7,076,170 B2 | 7/2006 | Choa | |
| 7,123,846 B2 | 10/2006 | Tateyama et al. | |
| 7,164,865 B2 | 1/2007 | Tatsuno et al. | |
| 7,187,821 B2 | 3/2007 | Matsui et al. | |
| 7,263,291 B2 | 8/2007 | Mahgerefteh et al. | |
| 7,280,721 B2 | 10/2007 | McCallion et al. | |
| 7,352,968 B2 | 4/2008 | Tayebati | |
| 7,356,264 B2 | 4/2008 | Mahgerefteh et al. | |
| 7,376,352 B2 | 5/2008 | Tayebati | |
| 7,406,266 B2 | 7/2008 | Mahgerefteh et al. | |
| 7,406,267 B2 | 7/2008 | Johnson et al. | |
| 7,433,605 B2 | 10/2008 | Mahgerefteh et al. | |
| 7,474,858 B2 | 1/2009 | Lee et al. | |
| 7,474,859 B2 | 1/2009 | Mahgerefteh et al. | |
| 7,477,851 B2 | 1/2009 | Mahgerefteh et al. | |
| 7,480,464 B2 | 1/2009 | McCallion et al. | |
| 7,492,976 B2 | 2/2009 | Mahgerefteh et al. | |
| 7,502,532 B2 | 3/2009 | McCallion et al. | |
| 7,505,694 B2 | 3/2009 | Johnson et al. | |
| 7,515,626 B2 | 4/2009 | Lee et al. | |
| 7,536,113 B2 | 5/2009 | Matsui et al. | |
| 7,542,683 B2 | 6/2009 | Matsui et al. | |
| 7,555,225 B2 | 6/2009 | Mahgerefteh et al. | |
| 7,558,488 B2 | 7/2009 | Matsui et al. | |
| 7,564,889 B2 | 9/2009 | Matsui et al. | |
| 7,609,977 B2 | 10/2009 | Matsui et al. | |
| 7,613,401 B2 | 11/2009 | Matsui et al. | |
| 7,616,902 B2 | 11/2009 | Mahgerefteh et al. | |
| 7,630,425 B2 | 12/2009 | Tayebati et al. | |
| 7,639,955 B2 | 12/2009 | Zheng et al. | |
| 7,657,179 B2 | 2/2010 | Mahgerefteh et al. | |
| 7,663,762 B2 | 2/2010 | Mahgerefteh et al. | |
| 7,697,186 B2 | 4/2010 | McCallion et al. | |
| 7,697,847 B2 | 4/2010 | Matsui et al. | |
| 7,742,542 B2 | 6/2010 | Mahgerefteh et al. | |
| 7,760,777 B2 | 7/2010 | Matsui et al. | |
| 7,778,295 B2 | 8/2010 | Matsui et al. | |
| 7,809,280 B2 | 10/2010 | Mahgerefteh et al. | |
| 7,860,404 B2 | 12/2010 | Matsui et al. | |
| 2001/0012430 A1 | 8/2001 | Usami et al. | |
| 2001/0048705 A1 | 12/2001 | Kitaoka et al. | |
| 2002/0012369 A1 | 1/2002 | Nasu et al. | |
| 2002/0044738 A1 | 4/2002 | Jablonski | |
| 2002/0048290 A1 | 4/2002 | Tanaka et al. | |
| 2002/0063930 A1 | 5/2002 | Blauvelt | |
| 2002/0131047 A1 | 9/2002 | Zarrabian et al. | |
| 2002/0154372 A1 | 10/2002 | Chung et al. | |
| 2002/0159490 A1 | 10/2002 | Karwacki | |
| 2002/0176659 A1 | 11/2002 | Lei et al. | |
| 2003/0002099 A1 | 1/2003 | Sayyah et al. | |
| 2003/0002120 A1 | 1/2003 | Choa | |
| 2003/0063647 A1 | 4/2003 | Yoshida et al. | |
| 2003/0067952 A1 | 4/2003 | Tsukiji et al. | |
| 2003/0077031 A1 | 4/2003 | Zhang et al. | |
| 2003/0099018 A1 | 5/2003 | Singh et al. | |
| 2003/0147114 A1 | 8/2003 | Kang et al. | |
| 2003/0161370 A1 | 8/2003 | Buimovich et al. | |
| 2003/0169787 A1 | 9/2003 | Vergaftman et al. | |
| 2003/0193974 A1 | 10/2003 | Frankel et al. | |
| 2003/0210912 A1 | 11/2003 | Leuthold | |
| 2004/0008933 A1 | 1/2004 | Mahgerefteh et al. | |
| 2004/0008937 A1 | 1/2004 | Mahgerefteh et al. | |
| 2004/0036943 A1 | 2/2004 | Freund et al. | |
| 2004/0076199 A1 | 4/2004 | Wipiejewski et al. | |
| 2004/0081386 A1 | 4/2004 | Morse et al. | |
| 2004/0086012 A1 | 5/2004 | Kitaoka et al. | |
| 2004/0096221 A1 | 5/2004 | Mahgerefteh et al. | |

| | | |
|---|---|---|
| 2004/0218890 A1 | 11/2004 | Mahgerefteh et al. |
| 2004/0234200 A1 | 11/2004 | Jennings et al. |
| 2005/0100345 A1 | 5/2005 | Welch et al. |
| 2005/0111852 A1 | 5/2005 | Mahgerefteh et al. |
| 2005/0152702 A1 | 7/2005 | Mahgerefteh et al. |
| 2005/0163512 A1 | 7/2005 | Tayebati et al. |
| 2005/0169638 A1 | 8/2005 | Tayebati et al. |
| 2005/0169642 A1 | 8/2005 | Mahgerefteh et al. |
| 2005/0175356 A1 | 8/2005 | McCallion et al. |
| 2005/0196177 A1 | 9/2005 | Moran |
| 2005/0206989 A1 | 9/2005 | Marsh |
| 2005/0213993 A1 | 9/2005 | Kazemi-Nia et al. |
| 2005/0249509 A1* | 11/2005 | Nagarajan et al. ............ 398/198 |
| 2005/0271394 A1 | 12/2005 | Whiteaway et al. |
| 2005/0286829 A1 | 12/2005 | Mahgerefteh et al. |
| 2005/0286909 A1* | 12/2005 | Kish et al. ..................... 398/196 |
| 2006/0002718 A1 | 1/2006 | Matsui et al. |
| 2006/0008272 A1 | 1/2006 | Abeles et al. |
| 2006/0018666 A1 | 1/2006 | Matsui et al. |
| 2006/0029358 A1 | 2/2006 | Mahgerefteh et al. |
| 2006/0029396 A1 | 2/2006 | Mahgerefteh et al. |
| 2006/0029397 A1 | 2/2006 | Mahgerefteh et al. |
| 2006/0078338 A1 | 4/2006 | Johnson et al. |
| 2006/0120416 A1 | 6/2006 | Hu et al. |
| 2006/0193636 A1 | 8/2006 | Katagiri et al. |
| 2006/0228120 A9 | 10/2006 | McCallion et al. |
| 2006/0233556 A1 | 10/2006 | Mahgerefteh et al. |
| 2006/0239306 A1 | 10/2006 | Donohoe |
| 2006/0274993 A1 | 12/2006 | Mahgerefteh et al. |
| 2007/0286608 A1 | 12/2007 | Matsui et al. |
| 2008/0002990 A1 | 1/2008 | McCallion et al. |
| 2008/0037608 A1 | 2/2008 | Zhou et al. |
| 2008/0159747 A1 | 7/2008 | Mahgerefteh et al. |
| 2008/0166134 A1 | 7/2008 | McCallion et al. |
| 2008/0181619 A1 | 7/2008 | Heismann |
| 2008/0187325 A1 | 8/2008 | McCallion et al. |
| 2008/0193132 A1 | 8/2008 | Matsui et al. |
| 2008/0193144 A1 | 8/2008 | Zhou et al. |
| 2008/0240180 A1 | 10/2008 | Matsui et al. |
| 2008/0247763 A1 | 10/2008 | Mahgerefteh et al. |
| 2008/0247765 A1 | 10/2008 | Mahgerefteh et al. |
| 2008/0291950 A1 | 11/2008 | McCallion et al. |
| 2009/0003842 A1 | 1/2009 | Mahgerefteh et al. |
| 2009/0060526 A1 | 3/2009 | Matsui et al. |
| 2009/0080905 A1 | 3/2009 | Olsson |
| 2009/0196631 A1* | 8/2009 | Daghighian et al. .......... 398/201 |
| 2009/0238224 A1 | 9/2009 | Ye |
| 2009/0269069 A1 | 10/2009 | Mahgerefteh et al. |
| 2010/0008679 A1 | 1/2010 | Cole |
| 2010/0098436 A1 | 4/2010 | Mahgerefteh et al. |
| 2010/0279447 A1 | 11/2010 | Matsui et al. |
| 2010/0311195 A1 | 12/2010 | Matsui et al. |

FOREIGN PATENT DOCUMENTS

| | | |
|---|---|---|
| CN | 1236891 | 12/1999 |
| CN | 200380108289.9 | 11/2007 |
| CN | 200380108289.9 | 8/2008 |
| CN | 200380108289.9 | 11/2008 |
| CN | 200580015245.0 | 9/2009 |
| CN | 200580012705.4 | 3/2010 |
| CN | 200580015245.0 | 3/2010 |
| CN | 200580037807 | 5/2010 |
| CN | 200880009551.7 | 7/2010 |
| EP | 0524758 | 7/1992 |
| EP | 602659 | 6/1994 |
| EP | 05731268.8 | 1/2008 |
| EP | 05764209.2 | 6/2009 |
| EP | 05731268.8 | 5/2010 |
| GB | 2 107 147 | 4/1983 |
| JP | 58-075340 | 5/1983 |
| JP | 62-189832 | 8/1987 |
| JP | 09-214427 | 8/1997 |
| JP | 11-031859 | 2/1999 |
| JP | 2000105313 | 4/2000 |
| JP | 2001-036477 | 2/2001 |
| JP | 2001-284711 | 10/2001 |
| JP | 2001291928 | 10/2001 |
| JP | 2001320328 | 11/2001 |
| JP | 2002243935 | 8/2002 |
| JP | 2002267834 | 9/2002 |
| JP | 2002267998 | 9/2002 |
| JP | 2002-311235 | 10/2002 |
| JP | 2004-551835 | 7/2008 |
| JP | 2004-551835 | 3/2010 |
| JP | 2009-504345 | 4/2010 |
| KR | 102008-7027139 | 4/2010 |
| WO | 9905804 | 2/1999 |
| WO | 0104999 | 1/2001 |
| WO | WO 0117076 | 3/2001 |
| WO | WO 0118919 | 3/2001 |
| WO | 03005512 | 7/2002 |

OTHER PUBLICATIONS

Koch, T. L. et al., Nature of Wavelength Chirping in Directly Modulated Semiconductor Lasers, Electronics Letters, Dec. 6, 1984, 1038-1039, vol. 20, No. 25/26.

Kurtzke, C., et al., Impact of Residual Amplitude Modulation on the Performance of Dispersion-Supported and Dispersion-Mediated Nonlinearity-Enhanced Transmission, Electronics Letters, Jun. 9, 1994, 988, vol. 30, No. 12.

Li, Yuan P., et al., Chapter 8: Silicon Optical Bench Waveguide Technology, Optical Fiber Communications, 1997, 319-370, vol. 111B, Lucent Technologies, New York.

Little, Brent E., Advances in Microring Resonators, Integrated Photonics Research Conference 2003.

Mohrdiek, S. et al., 10-Gb/s Standard Fiber Transmission Using Directly Modulated 1.55-um Quantum-Well DFB Lasers, IEEE Photonics Technology Letters, Nov. 1995, 1357-1359, vol. 7, No. 11.

Morton, P.A. et al., "38.5km error free transmission at 10Gbit/s in standard fibre using a low chirp, spectrally filtered, directly modulated 1.55um DFB laser", Electronics Letters, Feb. 13, 1997, vol. 33(4).

Prokais, John G., Digital Communications, 2001, 202-207, Fourth Edition, McGraw Hill, New York.

Rasmussen, C.J., et al., Optimum Amplitude and Frequency-Modulation in an Optical Communication System Based on Dispersion Supported Transmission, Electronics Letters, Apr. 27, 1995, 746, vol. 31, No. 9.

Shalom, Hamutal et al., On the Various Time Constants of Wavelength Changes of a DFB Laser Under Direct Modulation, IEEE Journal of Quantum Electronics, Oct. 1998, pp. 1816-1822, vol. 34, No. 10.

Wedding, B., Analysis of fibre transfer function and determination of receiver frequency response for dispersion supported transmission, Electronics Letters, Jan. 6, 1994, 58-59, vol. 30, No. 1.

Wedding, B., et al., 10-Gb/s Optical Transmission up to 253 km Via Standard Single-Mode Fiber Using the Method of Dispersion-Supported Transmission, Journal of Lightwave Technology, Oct. 1994, 1720, vol. 12, No. 10.

Yu, et al., Optimization of the Frequency Response of a Semiconductor Optical Amplifier Wavelength Converter Using a Fiber Bragg Grating, Journal of Lightwave Technology, Feb. 1999, 308-315, vol. 17, No. 2.

Corvini, P.J. et al., Computer Simulation of High-Bit-Rate Optical Fiber Transmission Using Single-Frequency Lasers, Journal of Lightwave Technology, Nov. 1987, 1591-1596, vol. LT-5, No. 11.

Lee, Chang-Hee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.

Dischler, Roman, Buchali, Fred, Experimental Assessment of a Direct Detection Optical OFDM System Targeting 10Gb/s and Beyond, Optical Fiber Communication/National Fiber Optic Engineers Conference, Feb. 24-28, 3 pages, San Diego, CA., 2008.

Dong Jae Shin, et al., Low-cost WDM-PON with Colorless Bidirectional Tranceivers, Journal of Lightwave Technology, Jan. 2006, pp. 158-165, vol. 24, No. 1.

Kikuchi, Nobuhiko, et al., Experimental Demonstration of Incoherent Optical Multilevel Staggered-APSK (Amplitude- and Phase-Shift Keying) Signaling, Optical Fiber Communication/National Fiber Optic Engineers Conference, Feb. 24-28, 2008, 3 pages, San Diego, CA.

Kiyoshi Fukuchi, Proposal and Feasibility Study of a 6-level PSK modulation format based system for 100 Gg/s migration, 2007, 3 pages.

Lammert et al., MQW DBR Lasers with Monolithically Integrated External-Cavity Electroabsorption Modulators Fabricated Without Modification of the Active Region, IEEE Photonics Technology Letters, vol. 9, No. 5, May 1997, pp. 566-568.

Mahgerefteh, D. and Fan, F., Chirp-managed-laser technology delivers > 250-km reach, Lightwave Online, 2005, PennWell Corporation. Accessed online Jul. 1, 2009 at: http://www.finisar.com/download_31wMeaCML_Application%20White%20Paper-LW.pdf.

Ronald Freund, Dirk Daniel Gross, Matthias Seimetz, Lutz Molle, Christoph Casper, 30 Gbit/s RZ 8-PSK Transmission over 2800 km Standard Single Mode Fibre without Inline Dispersion Compensation, 2007, 3 pages.

Tokle, Torger et al., Advanced Modulation Formats for Transmission Systems, Optical Fiber Communication/National Fiber Optic Engineers Conference, Feb. 24-28, 2008, 3 pages, San Diego, CA.

Matsui, Yasuhiro et al, Chirp-Managed Directly Modulated Laser (CML), IEEE Photonics Technology Letters, Jan. 15, 2006, pp. 385-387, vol. 18, No. 2.

Nakahara, K. et al, 40-Gb/s Direct Modulation With High Extinction Ratio Operation of 1.3-µm InGaAlAs Multiquantum Well Ridge Waveguide Distributed Feedback Lasers, IEEE Photonics Technology Letters, Oct. 1, 2007, pp. 1436-1438, vol. 19 No. 19.

Sekine, Kenro, et al., Advanced Multi-level Transmission Systems, Optical Fiber Communication/National Fiber Optic Engineers Conference, Feb. 24-28, 2008, 3 pages, San Diego, CA.

Sato, K. et al, Chirp Characteristics of 40-Gb/s Directly Modulated Distributed-Feedback Laser Diodes, Journal of Lightwave Technology, Nov. 2005, pp. 3790-3797, vol. 23, No. 11.

U.S. Appl. No. 11/964,315, Aug. 25, 2010, Office Action.
U.S. Appl. No. 11/964,321, Aug. 25, 2010, Office Action.
U.S. Appl. No. 12/115,337, Mar. 4, 2010, Office Action.
U.S. Appl. No. 12/115,337, Aug. 20, 2010, Office Action.
U.S. Appl. No. 12/047,017, Jun. 1, 2010, Restriction Requirement.
U.S. Appl. No. 12/047,017, Aug. 6, 2010, Office Action.
U.S. Appl. No. 12/053,344, Sep. 3, 2010, Notice of Allowance.

Dischler et al., Experimental Assessment of a Direct Detection Optical OFDM System Targeting 10Gb/s and Beyond, Optical Fiber Communication/National Fiber Optic Engineers Conference, Feb. 24-28, 3 pages, San Diego, CA., 2008.

Dong Jae Shin, et al., Low-cost WDM-PON with Colorless Bidirectional Tranceivers, Journal of Lightwave Technology, Jan. 2006, pp. 158-165, vol. 24, No. 1.

Freund et al, 30 Gbit/s RZ 8-PSK Transmission over 2800 km Standard Single Mode Fibre without Inline Dispersion Compensation, 2007, 3 pages.

Kikuchi, Nobuhiko et al., Experimental Demonstration of Incoherent Optical Multilevel Staggered-APSK (Amplitude- and Phase-Shift Keying) Signaling, Optical Fiber Communication/National Fiber Optic Engineers Conference, Feb. 24-28, 2008, 3 pages, San Diego, CA.

Kiyoshi Fukuchi, Proposal and Feasibility Study of a 6-level PSK modulation format based system for 100 Gg/s migration, 2007, 3 pages.

Lammert et al., MQW DBR Lasers with Monolithically Integrated External-Cavity Electroabsorption Modulators Fabricated Without Modification of the Active Region, IEEE Photonics Technology Letters, vol. 9, No. 5, May 1997, pp. 566-568.

Mahgerefteh, D. and Fan, F., Chirp-managed-laser technology delivers > 250-km reach, Lightwave Online, 2005, PennWell Corporation. Accessed online Jul. 1, 2009 at: http://www.finisar.com/download_31wMeaCML_Application%20White%20Paper-LW.pdf.

Mahgerefteh et al., Chirp managed laser (CML): A compact transmitter for dispersion tolerant 10 Gb/s networking applications; Optical Fiber Communication Conference, 2006 and the 2006 National Fiber Optic Engineers Conference. OFC 2006, Mar. 5-10, 2006; Digital Object Identifier: 10.1109/OFC.2006.215459.

Matsui, Yasuhiro et al, Chirp-Managed Directly Modulated Laser (CML), IEEE Photonics Technology Letters, Jan. 15, 2006, pp. 385-387, vol. 18, No. 2.

Nakahara, K. et al, 40-Gb/s Direct Modulation With High Extinction Ratio Operation of 1.3-µm InGaAlAs Multiquantum Well Ridge Waveguide Distributed Feedback Lasers, IEEE Photonics Technology Letters, Oct. 1, 2007, pp. 1436-1438, vol. 19, No. 19.

Sato, K. et al, Chirp Characteristics of 40-Gb/s Directly Modulated Distributed-Feedback Laser Diodes, Journal of Lightwave Technology, Nov. 2005, pp. 3790-3797, vol. 23, No. 11.

Sekine, Kenro et al., Advanced Multi-level Transmission Systems, Optical Fiber Communication/National Fiber Optic Engineers Conference, Feb. 24-28, 2008, 3 pages, San Diego, CA.

Tokle, Torger et al., Advanced Modulation Formats for Transmission Systems, Optical Fiber Communication/National Fiber Optic Engineers Conference, Feb. 24-28, 2008, 3 pages, San Diego, CA.

Wesstrom et al., State-of-the-art performance of widely tunable modulated grating Y-branch lasers; Optical Fiber Communication Conference, 2004. OFC 2004, vol. 1, No., pp. 2 vol. (1800), Feb. 23-27, 2004; doi: 10.1109/OFC.2004.1349295.

JP 2009-504345, Oct. 26, 2010, Office Action.
U.S. Appl. No. 12/014,676, Oct. 4, 2010, Office Action.
U.S. Appl. No. 12/017,957, Nov. 5, 2010, Office Action.
U.S. Appl. No. 12/028,675, Oct. 27, 2010, Office Action.
U.S. Appl. No. 12/028,678, Dec. 8, 2010, Office Action.
U.S. Appl. No. 12/047,017, Sep. 27, 2010, Notice of Allowance.
U.S. Appl. No. 12/053,344, Apr. 1, 2010, Office Action.
U.S. Appl. No. 12/115,337, Oct. 28, 2010, Notice of Allowance.
U.S. Appl. No. 12/184,137, Dec. 2, 2010, Notice of Allowance.

* cited by examiner

US 7,962,044 B2

TEMPERATURE STABILIZING PACKAGING FOR OPTOELECTRONIC COMPONENTS IN A TRANSMITTER MODULE

CROSS-REFERENCE TO RELATED APPLICATIONS

This application claims the benefit of U.S. Provisional Application Ser. No. 60/899,229, filed Feb. 2, 2007.

BACKGROUND OF THE INVENTION

1. The Field of the Invention

This invention has applications in high speed transmitters deployed in optical fiber-based communications systems.

2. The Relevant Technology

Laser transmitters have recently been developed in which a laser, such as a distributed feedback (DFB) laser, is directly modulated to produce adiabatically chirped pulses. The pulses are passed through an optical discriminator or 'optical spectrum reshaper' (OSR) that converts the adiabatically chirped pulses into pulses having an increased amplitude modulation and extinction ratio. In some systems, the OSR also performs a pulse shaping function.

In such systems, it is important that the laser frequency be aligned with respect to the transmission spectrum of the OSR. This is generally implemented by a control loop that compares the average optical power before and after the OSR component. The control loop maintains the DFB laser wavelength at a calibrated set point by continuously adjusting the DFB laser temperature via a thermoelectric cooler (TEC).

In some transmitters, the output of the laser and the amount of light reflected back from the OSR are measured to evaluate alignment of the laser frequency with respect to the OSR. It is therefore important that the frequency response of the OSR be maintained constant in order to provide an accurate reference for controlling the frequency of the laser.

In view of the foregoing it would be an advancement in the art to provide a system and method for stabilizing the frequency response of an OSR.

BRIEF SUMMARY OF THE INVENTION

In one aspect of the invention, a transmitter includes a directly modulated laser optically coupled to a filter assembly including an optical filter having a transmission edge. The optical filter is disposed within a housing formed of a material having substantially greater thermal conductivity than the optical filter. A temperature modulator and temperature sensor are in thermal contact with the housing and are electrically coupled to a controller that adjusts the temperature of the temperature modulator according to an output of the temperature sensor in order to maintain the transmission edge of the filter proximate a predetermined frequency.

In another aspect of the invention, the housing includes a copper-tungsten alloy that extends along the optical axis of the filter leaving opposing ends exposed. The housing may include plates adhered to the filter by means of a compliant adhesive, such as an ultraviolet cured adhesive. Each plate may be secured to adjacent plates by means of solder.

In another aspect of the invention, the temperature sensor is mounted to the housing at a midpoint between a first surface contacting the temperature modulator and a second surface opposite the first surface.

In another aspect of the invention, a photodiode is positioned to receive optical signals reflected from the optical filter. A locking circuit is coupled to the photodiode and the laser and controls the laser according to the output of the photodiode

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
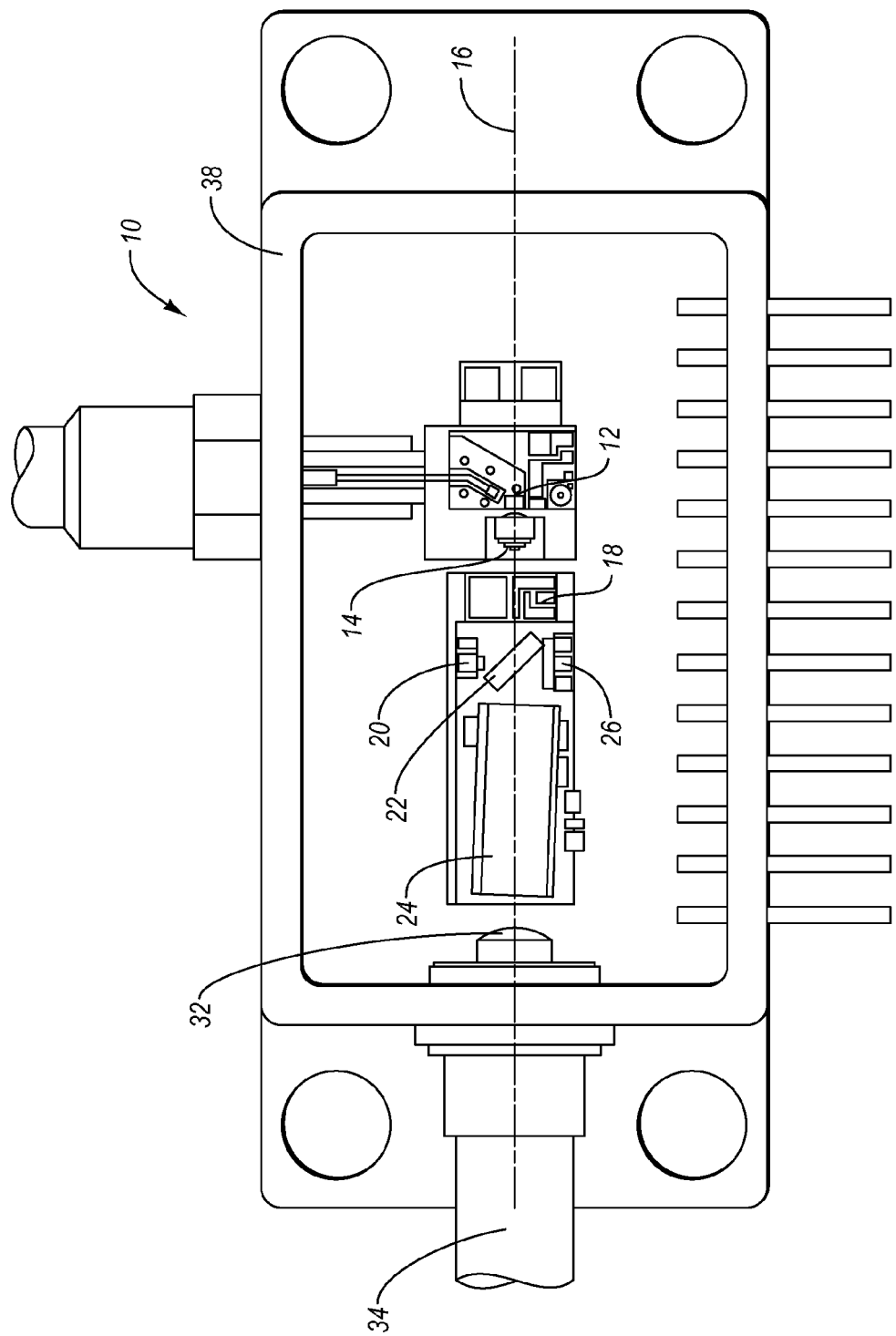
FIG. 1 is a top plan view of a transmitter module in accordance with an embodiment of the present invention.

Referring to FIG. 1, a transmitter module 10 includes a laser 12, such as a distributed feedback (DFB) laser. A collimating lens 14 is used to direct a collimated beam from the laser 12 along an optical axis 16. The beam may pass through an isolator 18 and a small fraction (typically 5%) is re-directed to a photodiode 20 by a tap beam splitter 22. The tap beam splitter 22 may be produced by depositing an anti-reflection coating on one side of a small piece of polished glass and a second controlled-reflection coating on the opposite side.

In one embodiment of the invention, the portion of the collimated beam passing through the beam splitter 22 is incident on an optical spectrum reshaper (OSR) 24 positioned on the optical axis 16. The OSR 24 may be embodied as one or more filters, including, but not limited to, a single cavity filter, coupled multi-cavity (CMC) filter, a thin film coupled multi-cavity filter, a periodic multi-cavity etalon, a fiber Bragg grating, a ring resonator filter, or any other optical element having a wavelength-dependent loss. The OSR 24 may also comprise a fiber, a Gire-Tournois interferometer, or some other element with chromatic dispersion. The OSR 24 may be fabricated as a solid optical element or may include gas-filled gaps, such as an OSR 24 embodied as a periodic multi-cavity etalon. In such embodiments, xenon, or other gas may be present in the gas-filled gaps.

In other embodiments, the OSR 24 is formed of a dielectric thin film. In particular time division multiplexing (TDM) applications that require lower cost and complexity may benefit from the use of a dielectric thin film OSR 24. However, dielectric thin film OSR 24 may still, in some module configurations, require thermal management as described hereinbelow.

The spectral response of the OSR 24 may be similar to a Fabry-Perot cavity in which non-transmitted light is reflected. Therefore, depending on the location of the lasing wavelength relative to the passband of the OSR 24, a portion of the incident optical beam will be transmitted while a residual portion of the incident beam is reflected. The reflected portion of the beam passes back through the tap beam splitter 22 and a portion of the power, such as about 5%, is diverted onto a second photodetector 26, as shown in FIG. 1.

In transmitters configured as described hereinabove, it is important to maintain spectral alignment of the wavelength of the laser 12 with respect to the OSR 24. In operation, the laser 12 may be biased to generate a base frequency signal and is modulated according to a data signal to generate adiabatically chirped pulses that include frequency excursions away from the base frequency, such as up to a peak frequency. The OSR 24 preferably includes a passband having a high slope spectral response, or "transmission edge" near, preferably between, the base and peak frequencies in order to convert at least a portion of the frequency modulation of the adiabatically chirped pulses to amplitude modulation and to increase the extinction ratio of the output of the OSR 24 by attenuating the base frequency.

Figure 2:
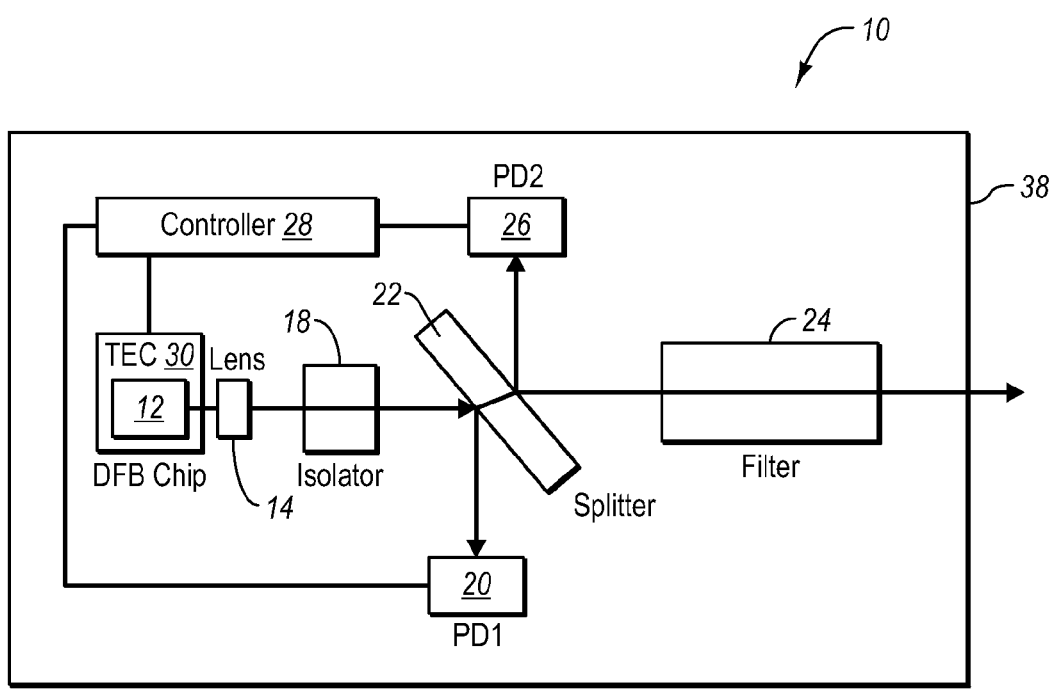
FIG. 2 is a schematic block diagram of a transmitter module in accordance with an embodiment of the present invention.

Referring to FIG. 2, while still referring to FIG. 1, the frequency alignment between the laser 12 and the OSR 24 is generally implemented by a controller 28 that compares the average optical power before and after the OSR 24. For example, the ratio of the photo currents produced by photodetectors 20, 26 may be used to "lock" the relative spectral positions of the laser 12 with respect to the response of the OSR 24. During calibration, the optimal set point for the laser wavelength relative to the OSR spectral response is determined. During operation, the control loop then acts to maintain the laser wavelength at this calibrated set point by continuously adjusting the laser temperature via a thermoelectric cooler (TEC) 30 to which it is coupled in response to the currents produced by the photodetectors 20, 26. For example, if the DFB lasing wavelength changes, the ratio of the photodiode signals provides an error signature allowing the controller 28 coupled to the TEC 30 to re-adjust the DFB temperature to maintain the correct wavelength.

Use of the OSR 24 to provide wavelength locking advantageously saves space within the module 10, which is important for optical layout design in a miniaturized transmitter module 10. The OSR 24 also provides a sharper spectral slope as compared to prior wavelength locking etalons. The OSR 24 provides these advantages while also serving as an optical discriminator enhancing the amplitude modulation and extinction ratio of the transmitter, and eliminating the need for an additional component for providing the wavelength locking functionality. Double-function of the OSR 24 is an important aspect of the above described transmitter 10 and is compatible with the implementation of a TOSA in an XFP transceiver.

The OSR 24 may be angled with respect to an optical axis 16 of the beam incident on the OSR 24. For example, an angle of from 0.5 to two degrees from normal may be used. The angle of the OSR 24 relative to the optical axis 16 may be used to fine-tune the spectral response of the OSR 24 and also minimize back-reflection along the optical path. The spectral response may also be tuned by changing the temperature of the OSR 24. One or both of the temperature and angle may be adjusted to cause the spectral response of the OSR to coincide with the ITU grid.

The output of the OSR 24 may be focused by a lens 32 and coupled to a standard optical fiber 34, such as a standard single-mode optical fiber. A second optical isolator component may optionally be added between the lens 32 and the fiber 34.

Transmitters as described above enable a 10 Gb/s directly modulated laser operating in the C & L band to transmit information over a >200 km fiber length without the need for dispersion compensation. This is a breakthrough achievement when compared with transmission distances of <20 km for standard directly modulated laser transmitters. Such transmitters may be deployed in both time division multiplexing (TDM) and dense wavelength division multiplexing (DWDM) optical links.

For reliable performance over module lifetime and case temperature extremes, several optoelectronic packaging techniques may be employed, in particular to facilitate DWDM implementation of the above-described technology. The DWDM version, and others, of the above described technology may advantageously use an OSR 24 that is temperature controlled to maintain good optical performance and also provide a wavelength locking function. The physical size and high-performance optical specifications of the OSR 24 make a strong demand on the thermal management to achieve the desired optical performance over all environmental conditions.

As for most solid-etalon wavelength locker configurations, the temperature of the OSR 24 is preferably tightly controlled to maintain accurate calibration of the spectral response for locking purposes. A typical transmission-etalon type locker is also dependent on minimal change in insertion loss over life and temp. However, the filter slope of the OSR 24 is preferably higher than standard locker etalon and thus can help compensate for residual changes in insertion loss and thereby keep the locking accuracy budget acceptable.

Active temperature control of the OSR 24 can lead to varying thermal gradients across the material constituting the OSR 24 as the module case temperature changes. This is due to several contributions, including thermal conductivity of the OSR material, thermal conductivity of the surrounding internal module environment (including Nitrogen, Argon, or Xenon gas), initial calibration conditions, and magnitude of the case temperature variation. Thermal gradients across the OSR 24 cause "averaging" of a range of spectral responses resulting in an increase in insertion loss and reduction in effective spectral slope. These parameters are of particular concern for transmission performance as well as wavelength stability of the module.

Thermal management of the OSR 24 may be improved by encasing the OSR 24 within a hermetically sealed housing 38 filled with an inert gas such as Xenon. The low thermal conductivity of Xenon gas reduces the thermal gradients experienced by the OSR 24 and the result is improved wavelength locking accuracy and OSR performance over case temperature variation.

A preferred design of the OSR 24 would also use a high thermal conductivity material such as Silicon or Sapphire. This would greatly enhance temperature uniformity within the OSR material, although there are drawbacks in terms of wavelength sensitivity. There are also manufacturing tolerance issues that, to date, have prevented successful implementation of the OSR 24 using these materials. In the absence of a high thermal conductivity material, the OSR 24 may be fabricated from a high refractive index optical glass such as LaSFN9 material. Fused silica and other standard polishing glasses may also be used. LaSFN9 (and optical glasses in general) exhibit low thermal conductivity.

Figure 3:
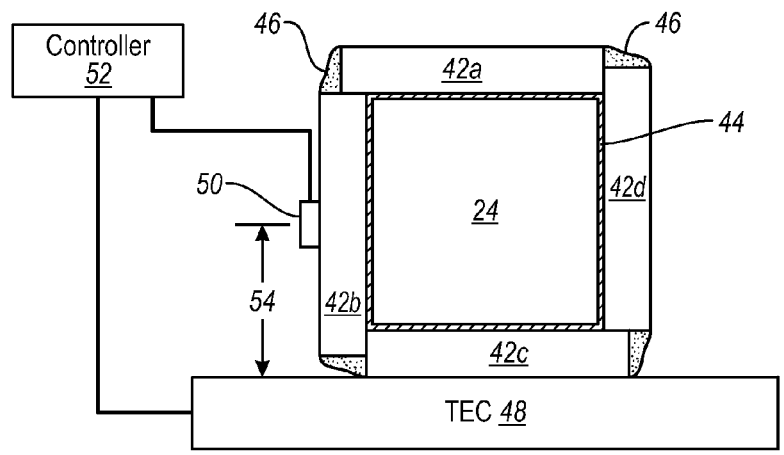
FIG. 3 is a front elevation view of a temperature stabilizing system for an optical filter in accordance with an embodiment of the present invention.
Figure 4:
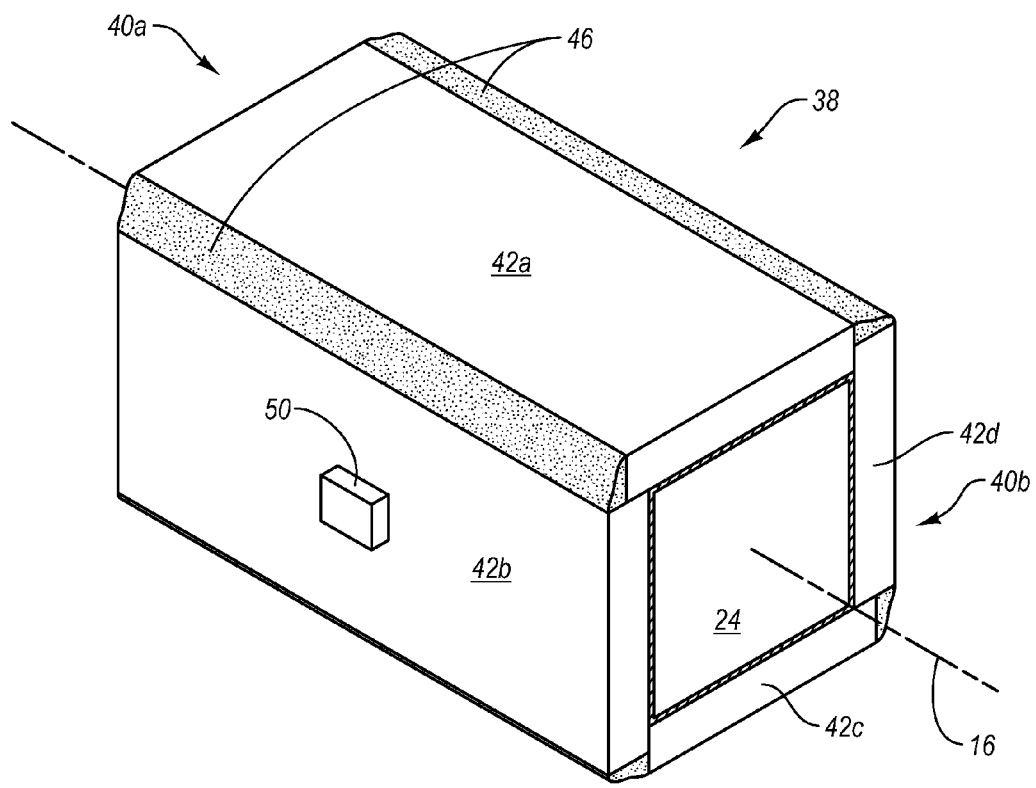
FIG. 4 is an isometric view of a housing suitable for use in the temperature stabilizing system of FIG. 3.

Referring to FIGS. 3 and 4, an OSR 24 in accordance with the invention includes an isothermal housing 38. Good performance of the isothermal housing 38 is important due to sensitivity of the OSR 24 to thermal gradients. The isothermal housing 38 surrounds the OSR 24, leaving ends 40a, 40b exposed, such that a beam may pass through the OSR 24 along the optical axis 16.

The isothermal housing 38 preferably has a much higher thermal conductivity than the OSR 24. For example, the housing 38 may be formed of a copper-tungsten alloy (CuW) or aluminum nitride (AlN). The use of a material having high thermal conductivity, such as a CuW alloy, enhances temperature uniformity across the actual OSR 24. The temperature of the OSR 24 may be maintained to within 0.05° C. accuracy to provide very accurate wavelength stability. The housing 38 preferably has a coefficient of thermal expansion substantially equal that of the OSR 24. For example, a CuW housing is well suited for encasing an OSR 24 formed of LaSFN9.

In the illustrated embodiment, the housing 38 includes plates 42a-42d secured to sides of the OSR 24. The plates 42a-42d are preferably secured to the sides of the OSR 24 by means of a compliant adhesive 44, such as an ultraviolet cured epoxy. The compliant adhesive 44 may advantageously accommodate differences in the coefficient of thermal expansion of the housing 38 and OSR 24. In an alternative embodiment, no adhesive 44 is used. In such embodiments, the OSR 24 is preferably in close contact with the plates 42a-42d. However, angle differences between sides of the OSR 24 and the plates 42a-42d may result in air gaps that may be filled with whatever gas is present in the transmitter 10, such as xenon.

Edges of adjacent plates 42a-42d may be joined to one another by means of solder beads 46, such as a lead-tin alloy, in order to enhance the equalization of temperature at the corners of the housing 38. Alternatively, a highly thermally conductive adhesive may be used such as a silver epoxy.

The housing 38 may mount to a thermoelectric cooler (TEC) 48. In the illustrated embodiment, only one TEC 48 is used. In other embodiments, more than one TEC 48, each engaging one of the plates 42a-42d, may be used. A temperature sensor 50 is in thermal contact with the housing 38. The TEC 48 and temperature sensor 50 are electrically coupled to a controller 52 that controls the temperature of the TEC 48 according to the output of the temperature sensor 50. In some embodiments, the temperature sensor 50 is located at a distance 54 midway between the TEC 48 and the top of the housing 38 in order to provide more accurate feedback regarding the average temperature of the housing 38. The temperature sensor 50 may also be located at about midpoint of the length of the housing 44 as illustrated. In an alternative embodiment, the TEC 48 is replaced with a heater element in thermal contact with the housing 38 and electrically coupled to the controller 52. Inasmuch as the heater element provides temperature stabilization by heating alone, the OSR 24 in such embodiments is preferably stabilized at a temperature above the maximum module case temperature range of the transmitter module 10.

The photodetectors 20, 26 may also be disposed to reduce temperature induced variation. In some embodiments, the photodetectors 20, 26 are embodied as InGaAs photodiodes and are preferably located in close physical proximity to one another, as shown in the module layout of FIG. 1. This produces a similar thermal environment for the two photodiodes 20, 26 under all conditions and is also compatible with transitioning the optical layout design into a miniaturized TOSA package. Similarly, the common tap splitter 22 (where a "reflection-mode" configuration is adopted with the OSR spectral response) helps to cancel residual interference and subcavities that could modify "effective" lock ratio over life and/or temperature. In addition, the photodetectors 20, 26 and tap beam splitter 22 may all be located on a common temperature controlled substrate to reduce sensitivity to case temperature variation. For example, the photodetectors 20, 26 and tap beam splitter 22 may be coupled to the same TEC 48 as the OSR 24.

Figure 5A:
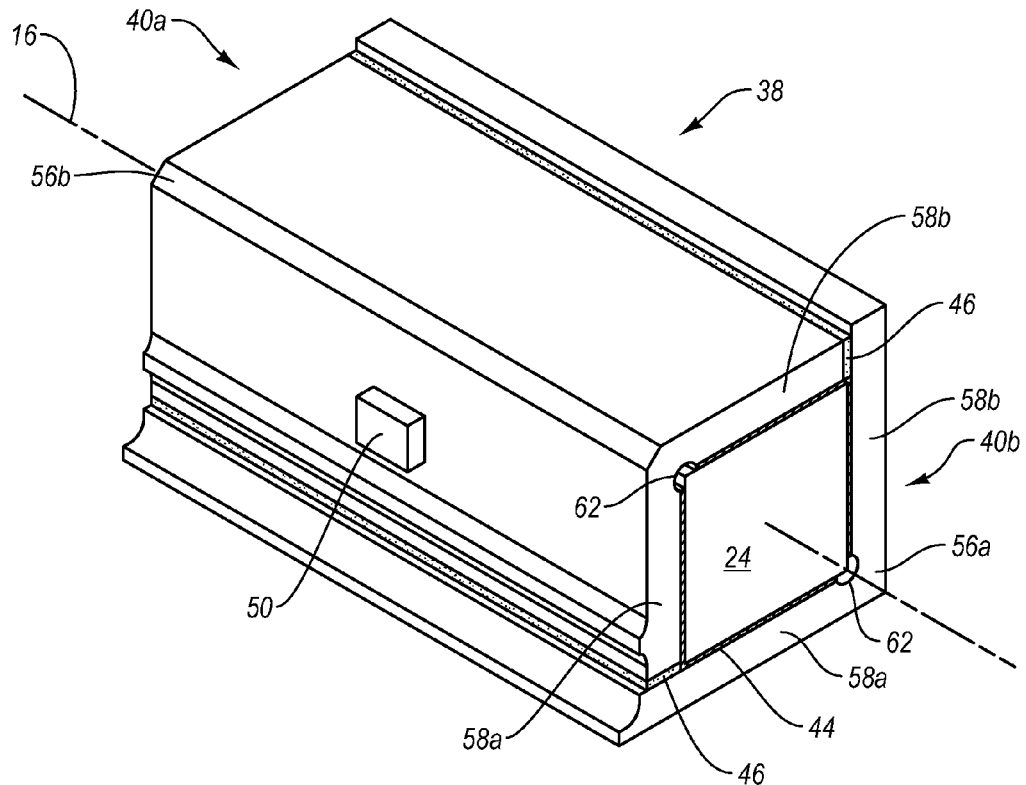
FIG. 5A is an isometric view of an alternative embodiment of a housing suitable for use in a temperature stabilizing system for an optical filter in accordance with an embodiment of the present invention.
Figure 5B:
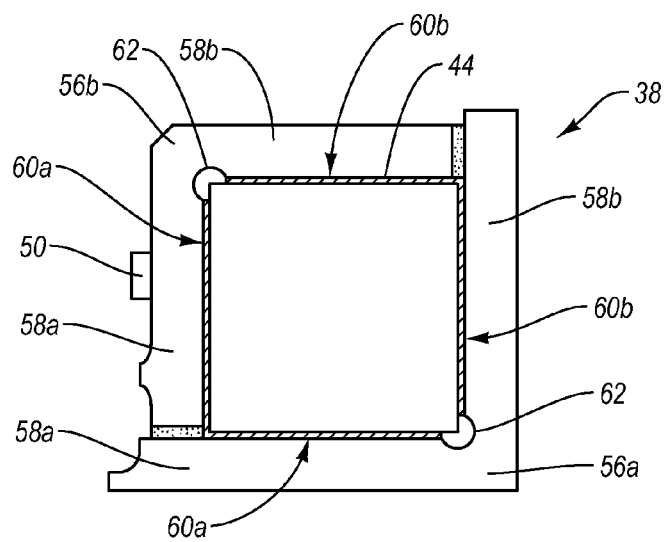
FIG. 5B is a front elevation view of the housing of FIG. 5A.

Referring to FIGS. 5A and 5B, in an alternative embodiment, the isothermal housing 38 is formed of angled plates 56a, 56b each having two legs 58a, 58b bearing surfaces 60a, 60b, respectively, that are positionable adjacent surfaces of the OSR 24. The use of angled plates 56a, 56b reduces manufacturing costs by eliminating two solder joints as compared with the embodiment of FIG. 4.

As in the embodiments above, the angled plates 56a, 56b are preferably formed of a material having high thermal conductivity such as CuW or AlN. In the illustrated embodiment, a channel 62 is formed at the intersection of the surfaces 60a, 60b. The channel 62 receives a corner of the OSR 24 and may serve to loosen tolerances that would be required to form an intersection of the surfaces 60a, 60b that exactly matched the corner of the OSR 24.

The legs 58a, 58b of the angled plate 56a are larger than the legs 58a, 58b, of the angled plate 56b, such that the other angled plate 56b can be readily nested against the angled plate 56a. As in the above embodiments, the angled plates 56a, 56b may secure to the OSR 24 by means of an adhesive 44, such as a UV cured epoxy. The angled plates 56a, 56b may be secured to one another by solder or by an adhesive, such as a silver epoxy.

In the illustrated embodiment, the leg 58a of the angled plate 56a extends beyond the angled plate 56b of the assembled housing 38. The larger leg 58a preferably secures to a substrate such as the TEC 48. Its increased length may facilitate securement to the TEC 48 due to a larger area available for bearing an adhesive. The larger area of the leg 58a may also facilitate a higher rate of heat transfer with the TEC 48.

Figure 6A:
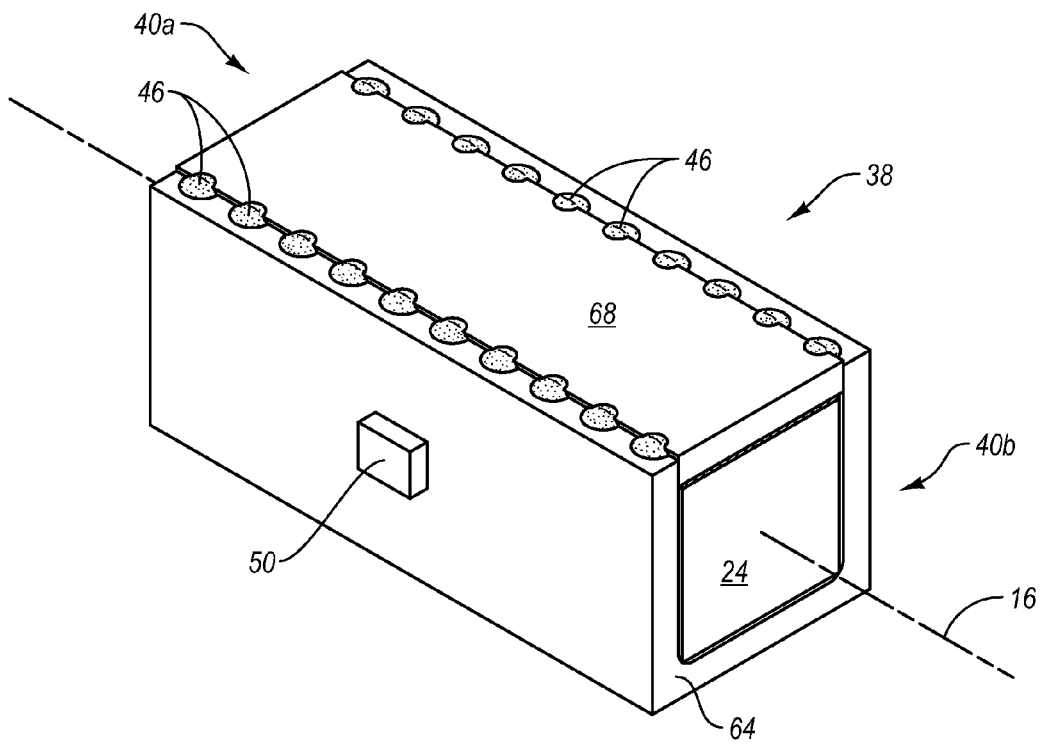
FIG. 6A is an isometric view of another alternative embodiment of a housing suitable for use in a temperature stabilizing system for an optical filter in accordance with an embodiment of the present invention.
Figure 6B:
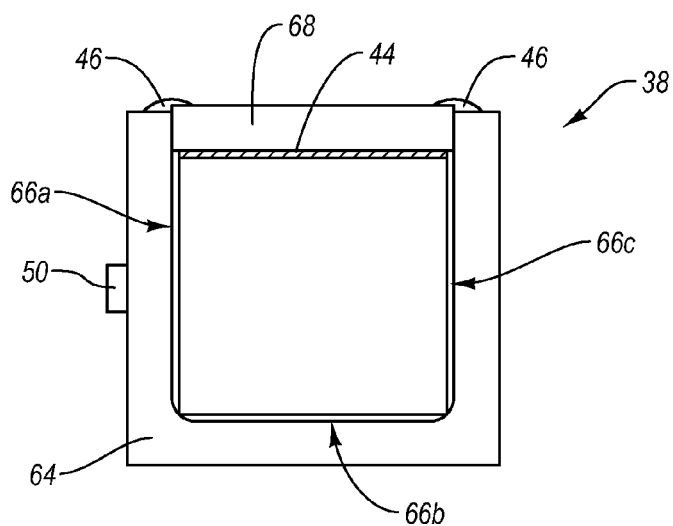
FIG. 6B is a front elevation view of the housing of FIG. 6A.

Referring to FIGS. 6A and 6B, in another alternative embodiment, the housing 38 includes a U-shaped member 64 having surfaces 66a-66c for engaging surfaces of the OSR 24. A top plate 68 secures across the U-shaped member 64 such that the top plate 68 and U-shaped member 64 completely encircle the OSR 24. The top plate 68 and U-shaped member may include a material having high thermal conductivity such as CuW or AlN. The top plate 68 is secured to the U-shaped member 64 by means of solder 46 or silver epoxy.

The OSR 24 may secure to one or both of the top plate 68 and U-shaped member 64 by means of an adhesive 44, such as a UV cured epoxy. In some embodiments, a channel may be formed at the intersections of the surfaces 66a and 66b and the surfaces 66b and 66c to receive the corners of the OSR 24, as in the embodiment of FIGS. 5A and 5B. In the illustrated embodiment, no such channels are formed such that a small gap exists between the surfaces of the OSR 24 and the surfaces 66a-66c. The gap may be filled with a gas such as xenon or may be filled with an adhesive, such as a UV cured epoxy.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A transmitter module comprising:
   a laser;
   a filter assembly comprising:
   an optical filter having at least one transmission edge,
   a housing surrounding a substantial portion of the optical filter and comprising a material having a thermal conductivity substantially greater than the optical filter,
   a temperature modulator in thermal contact with the housing and not in direct thermal contact with the optical filter, and
   a temperature sensor in thermal contact with the housing and not in direct thermal contact with the optical filter; and
   a temperature stabilization circuit coupled to the temperature modulator and temperature sensor and operable to control a temperature of the temperature modulator according to an output from the temperature sensor to maintain the transmission edge of the optical filter proximate a predetermined frequency.

2. The transmitter module of claim 1, further comprising:
   a photodiode positioned to receive optical signals reflected from the optical filter; and
   a locking circuit coupled to the photodiode and the laser, the locking circuit controlling the laser according to the output of the photodiode to maintain a frequency of an output of the laser in a predetermined relationship to the transmission edge of the optical filter.

3. The transmitter module of claim 2, wherein the photodiode is a first photodiode, the transmitter module further comprising a second photodiode positioned to detect an output of the laser, wherein the locking circuit is coupled to the second photodiode and is operable to control the laser according to a comparison of outputs of the first and second photodiodes.

4. The transmitter module of claim 2, wherein the laser comprises a thermoelectric cooler and wherein the locking circuit is coupled to the thermoelectric cooler and is operable to maintain the output of the laser proximate the transmission edge of the optical filter by changing a temperature of the thermoelectric cooler.

5. The transmitter module of claim 1, wherein the housing comprises a copper-tungsten alloy.

6. The transmitter module of claim 1, wherein the housing comprises a plurality of plates, each of two opposing edges of each plate joined to an edge of an adjacent plate by a solder material.

7. The transmitter module of claim 1, wherein the housing comprises first and second angled plates secured to at least one of one another and the optical filter.

8. The transmitter module of claim 7, wherein the each of the first and second angled plates comprise two legs substantially perpendicular to one another, the legs of the first angled plate being longer than the legs of the second angled plate.

9. The transmitter module of claim 1, wherein the housing comprises a U-shaped channel sized to receive the optical filter and a top plate extending across the U-shaped channel and securing to at least one of the U-shaped channel and the optical filter.

10. The transmitter module of claim 1, wherein the laser directs optical signals through the optical filter along an optical axis and wherein the housing encircles the optical axis and extends along at least a majority of and an extent of the optical filter along the optical axis.

11. The transmitter module of claim 1, wherein the housing is bonded to the optical filter using epoxy.

12. The transmitter module of claim 11, wherein the epoxy is a compliant epoxy.

13. The transmitter module of claim 12, wherein the epoxy is an ultraviolet cured epoxy or thermally cured epoxy.

14. The transmitter module of claim 1, wherein a coefficient of thermal expansion of the housing is substantially equal that of the optical filter.

15. The transmitter module of claim 1, wherein the optical filter is disposed within a hermetically sealed chamber containing Xenon.

16. The transmitter module of claim 1, wherein the optical filter comprises a glass etalon.

17. The transmitter module of claim 16, wherein the optical filter comprises LaSFN9.

18. The transmitter module of claim 1, wherein the temperature modulator is a thermoelectric cooler.

19. The transmitter module of claim 1, wherein the temperature sensor is located approximately midway between a first surface of the housing secured to the temperature modulator and a second surface of the housing opposite the first surface.

20. The transmitter module of claim 1, wherein the temperature modulator is a heating element.

21. A method for transmitting optical signals comprising:
   measuring a temperature of a housing surrounding an optical filter having a temperature dependent spectral transmission edge, the housing having substantially higher thermal conductivity than the optical filter;
   driving the temperature of the housing toward a reference temperature according to the measured temperature; and
   emitting an optical signal through the optical filter, the optical signal having a frequency proximate the transmission edge.

22. The method of claim 21, further comprising measuring transmission of the optical signal through the optical filter and adjusting a frequency of the optical signal according to the measured transmission.

23. The method of claim 21, further comprising modulating the optical signal such that the frequency transitions back and forth across the transmission edge according to a data sequence.

24. The method of claim 21, wherein the housing comprises a copper-tungsten alloy.

25. The method of claim 21, wherein emitting the optical signal through the optical filter comprises emitting the optical signal along an optical axis of the optical filter between first and second ends thereof and wherein the housing encircles the optical axis and extends along substantially an entire extent of the optical filter between the first and second ends.

26. The method of claim 21, wherein the optical filter is disposed within a hermetically sealed chamber containing Xenon.

27. The method of claim 21, wherein measuring the temperature of the housing comprises reading an output of a temperature sensor located approximately midway between a first surface of the housing secured to a temperature modulator and a second surface of the housing opposite the first surface; and wherein driving the temperature of the housing toward the reference temperature according to the measured temperature comprises adjusting a temperature of the temperature modulator according to the output of the temperature sensor.

* * * * *